(12) United States Patent
Kim et al.

(10) Patent No.: US 10,165,626 B2
(45) Date of Patent: Dec. 25, 2018

(54) PIPE HEATER

(71) Applicant: TSC INC., Hwaseong-si, Gyeonggi-do (KR)

(72) Inventors: Oh Su Kim, Suwon-si (KR); Sun Il Park, Yongin-si (KR)

(73) Assignee: TSC Inc., Hwaseong-si, Gyeonggi-do (KR)

( * ) Notice: Subject to any disclaimer, the term of this patent is extended or adjusted under 35 U.S.C. 154(b) by 632 days.

(21) Appl. No.: 14/844,734

(22) Filed: Sep. 3, 2015

(65) Prior Publication Data

US 2016/0146393 A1    May 26, 2016

(30) Foreign Application Priority Data

Nov. 25, 2014    (KR) .................. 10-2014-0164928

(51) Int. Cl.
  *H05B 3/58*    (2006.01)
  *F16L 59/14*    (2006.01)
  *F16L 53/38*    (2018.01)

(52) U.S. Cl.
  CPC ............. *H05B 3/58* (2013.01); *F16L 53/38* (2018.01); *F16L 59/14* (2013.01); *H05B 2203/003* (2013.01)

(58) Field of Classification Search
  None
  See application file for complete search history.

(56) References Cited

U.S. PATENT DOCUMENTS

| | | | |
|---|---|---|---|
| 4,484,061 A * | 11/1984 | Zelinka | G01N 30/30 137/341 |
| 4,874,648 A * | 10/1989 | Hill | B29C 44/5636 428/35.9 |
| 5,714,738 A | 2/1998 | Hauschulz et al. | |
| 2013/0062338 A1 * | 3/2013 | Iida | H05B 3/02 219/548 |
| 2014/0029925 A1 * | 1/2014 | Smith | H05B 3/02 392/468 |
| 2014/0183180 A1 * | 7/2014 | Watakabe | H05B 3/36 219/478 |
| 2016/0003397 A1 * | 1/2016 | Miyazaki | B29C 65/02 428/212 |

FOREIGN PATENT DOCUMENTS

| | | |
|---|---|---|
| JP | 2002295783 A | 10/2002 |
| KR | 100413699 B1 | 3/2004 |
| KR | 20110126035 A | 11/2011 |
| KR | 20130006463 A | 1/2013 |
| KR | 20130030517 A | 3/2013 |

* cited by examiner

*Primary Examiner* — Joseph M Pelham
(74) *Attorney, Agent, or Firm* — Hauptman Ham, LLP

(57) ABSTRACT

Disclosed is a pipe heater comprising a tubular heat insulating layer having a pair of separating surfaces formed over the entire length thereof, an external cover bonded to the outer surface of the heat insulating layer to enclose the heat insulating layer, a heating layer provided inside the heat insulating layer and including a heating wire therein, and an internal cover provided inside the heating layer to enclose the heating layer, wherein the heat insulating layer includes a polyimide foam layer formed of polyimide foam, and a protection layer is interposed between the heat insulating layer and the heating wire to prevent bubbles distributed in the polyimide foam layer from dissipating due to heat transferred from the heating wire.

1 Claim, 7 Drawing Sheets
(1 of 7 Drawing Sheet(s) Filed in Color)

PIPE HEATER

CROSS REFERENCE TO RELATED APPLICATION

This application claims the priority of Korea Patent Application 10-2014-0164928, filed on Nov. 25, 2014 in the KIPO (Korean Intellectual Property Office), which is incorporated herein by reference in its entirety.

BACKGROUND OF THE INVENTION

1. Field of the invention

The present invention relates to a pipe heater, and more particularly, to a heater for heating a pipe to a proper temperature.

2. Description of the Prior Art

Some warming or heating purpose heating apparatuses are provided with a pipe heater that heats a pipe, installed together with, for example, a chemical material coating or deposition installation or a semiconductor manufacturing installation, to a proper temperature so as to prevent by-product deposited on the inner wall of the pipe from being fixed.

FIG. 5 is a perspective view a conventional pipe heater, FIG. 6 is a sectional view taken along line C-C' in FIG. 5, and FIG. 7 is a sectional view taken along line D-D' in FIG. 6.

As illustrated in the drawings, the conventional pipe heater includes a tubular heat insulating layer 110 having a pair of separating surfaces 111a formed over the entire length thereof, an external cover 142 bonded to the outer surface of the heat insulating layer 110 to enclose the heat insulating layer 110, a heating layer 120 installed inside the heat insulating layer 110 and provided with a heating wire 121, an internal cover 141 installed inside the heating layer 120 to enclose the heating layer 120, a restraint part 145 bonded to the external cover 142, lead wires 132 electrically connected to the heating wire 121, and connectors 131 electrically connected to the lead wire 132.

The heat insulating layer 110 is formed of aramid felt.

The heat insulating layer 110 formed thereby suppresses heat generated from the heating wire 121 from being transferred to the external cover 142.

The external cover 142 is formed of an insulating material such as PTFE (polytetrafluoroethylene).

In addition to the heating wire 121, the heating layer 120 includes a heating wire support base 122 that supports the heating wire 121.

The heating wire 121 is formed of an insulation-coated nichrome wire.

The heating wire 121 formed thereby fixed to the heating wire support base 122 by a sewing thread 123 formed of a heat-resistant material such as silica.

The heating wire support base 122 is made of a glass fiber tape.

In the state where the heating layer 120 is installed, the heat generated from the heating wire 121 is transferred to an object to be heated, i.e. the pipe through the internal cover 141.

The temperature heated by the heating layer 120 is detected by a temperature sensor, and a temperature value detected by the temperature sensor is provided to a heater control unit (that performs an ON/OFF control on a heating voltage supplied to the heating wire) or a control unit of an apparatus (e.g., a semiconductor process apparatus).

The internal cover 141 is formed of an insulating material, such as PTFE (polytetrafluoroethylene).

The restraint part 145 may be attached to the external cover 142 using, for example, female and male Velcro tapes.

The heating wire 121 is electrically connected to an external power source through the lead wires 132 and the connectors 131.

However, the conventional pipe heater has a problem in that since the heat insulating layer 110 is formed of felt, it is structurally poor in heat insulating property and has a limit in improving the heat insulating property by increasing the thickness thereof.

Korean Patent No. 10-1439989 (registered on Sep. 3, 2014 and entitled "Pipe Heater and Electromagnetic Wave Shielding Apparatus for the Same") discloses a technique related to the conventional pipe heater as described above.

SUMMARY OF THE INVENTION

Accordingly, an object of the present invention is to provide a pipe heater that is improved in heat insulating property and is adapted to be easily improved in the heat insulating property.

In order to accomplish these objects, there is provided a pipe heater including a tubular heat insulating layer having a pair of separating surfaces formed over the entire length thereof, an external cover bonded to the outer surface of the heat insulating layer to enclose the heat insulating layer, a heating layer provided inside the heat insulating layer and including a heating wire therein, and an internal cover provided inside the heating layer to enclose the heating layer. The heat insulating layer includes a polyimide foam layer formed of polyimide foam and a protection layer is interposed between the heat insulating layer and the heating wire to prevent bubbles distributed in the polyimide foam layer from dissipating due to heat transferred from the heating wire.

Here, the protection layer may be formed of a polyimide film so as to reduce the amount of heat transferred from the heating wire to the polyimide foam layer.

In addition, in order to form the protection layer using polyimide fiber characterized by a high melting point while solving a problem of degradation of a heat insulating property of a cloth, the protection layer may be formed by coating a polyimide resin on both surfaces of a woven polyimide fiber cloth.

According to the present invention, since the heat insulating layer is formed to include a polyimide foam layer formed of polyimide foam, and the protection layer interposed between the polyimide foam layer and the heating wire is added so as to prevent the bubbles distributed in the polyimide foam layer from dissipating due to the heat transferred from the heating wire, the pipe heater is improved in heat insulating property as it takes a foam structure and dissipation of bubbles is prevented, and its heat insulating property may be easily improved by increasing the thickness of the protection layer.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, the present invention will be described in detail with reference to the accompanying drawings.

Figure 1:
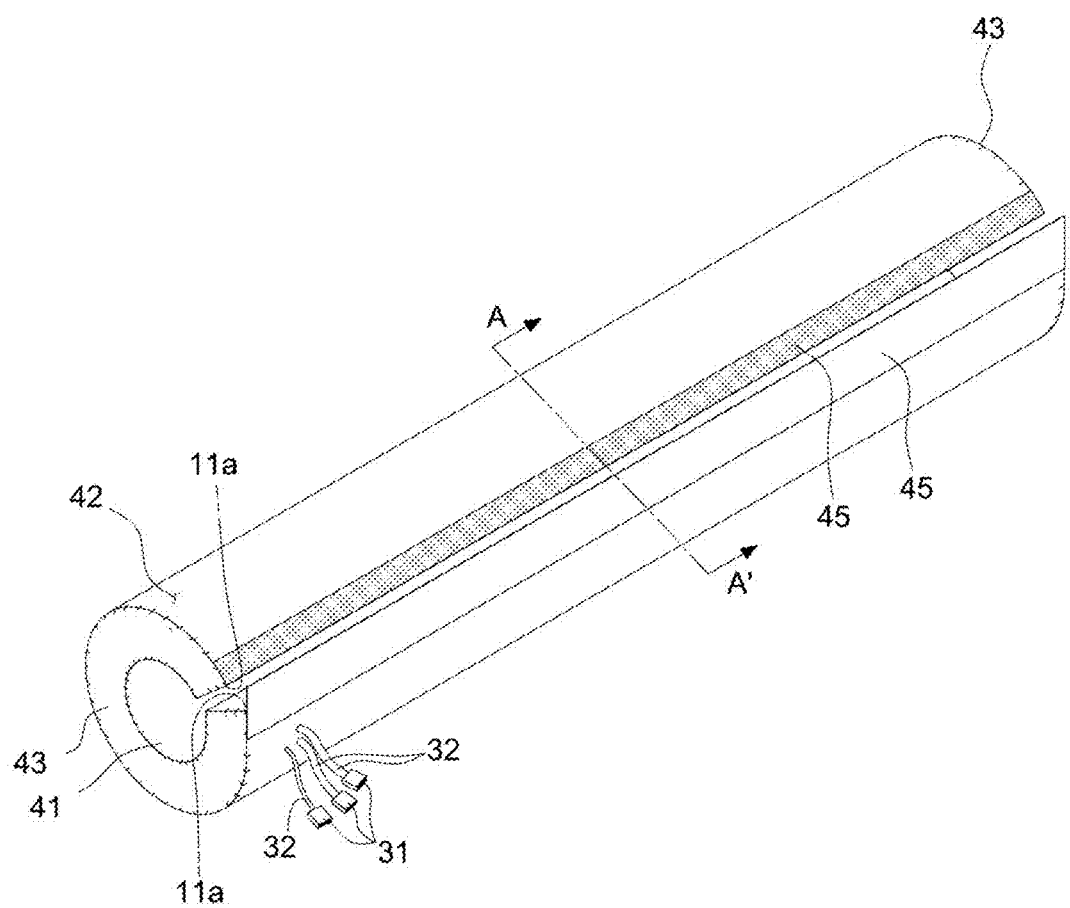
FIG. 1 is a perspective view of a pipe heater according to an embodiment of the present invention.
Figure 2:
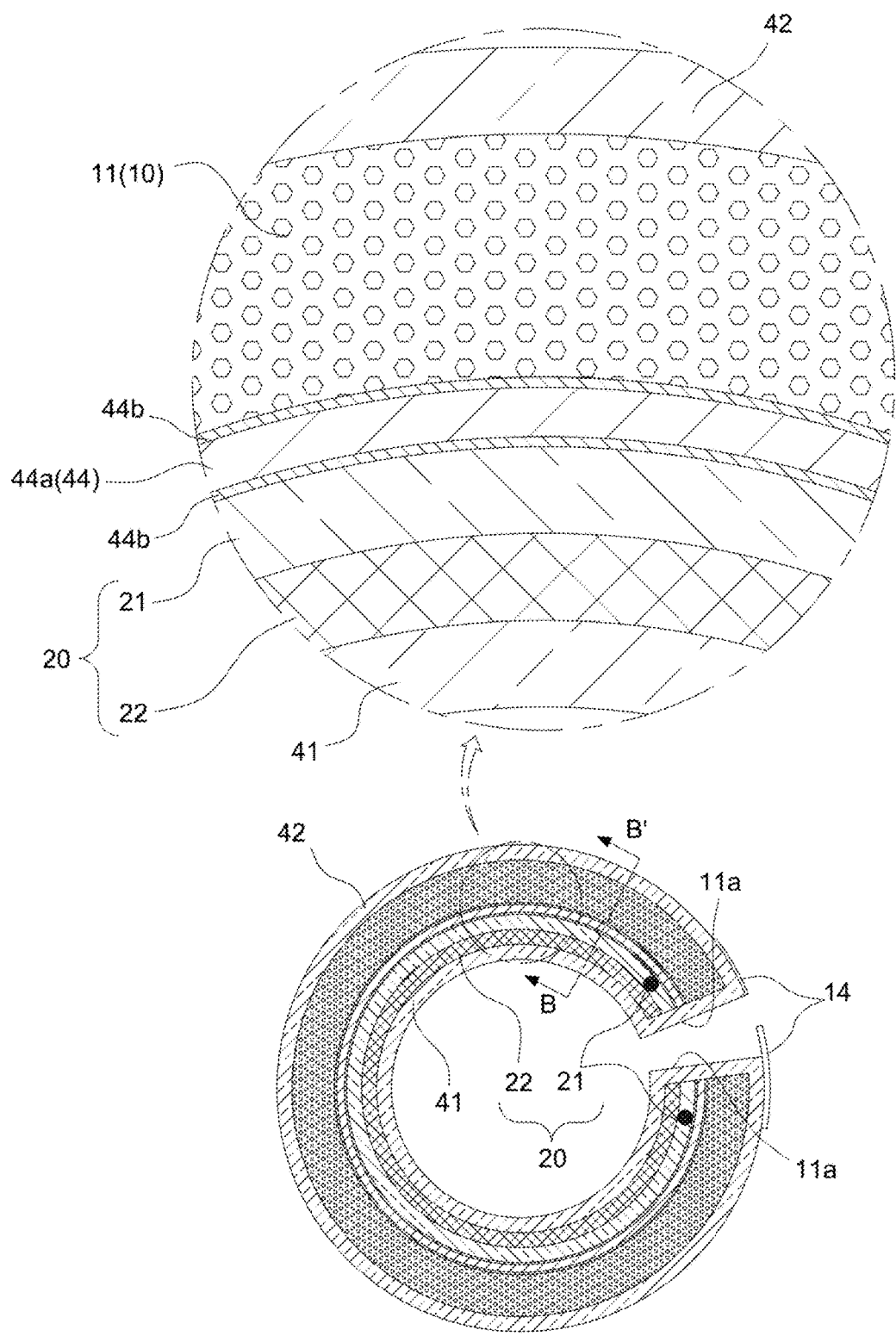
FIG. 2 is a sectional view taken along line A-A' in FIG. 1.
Figure 3:
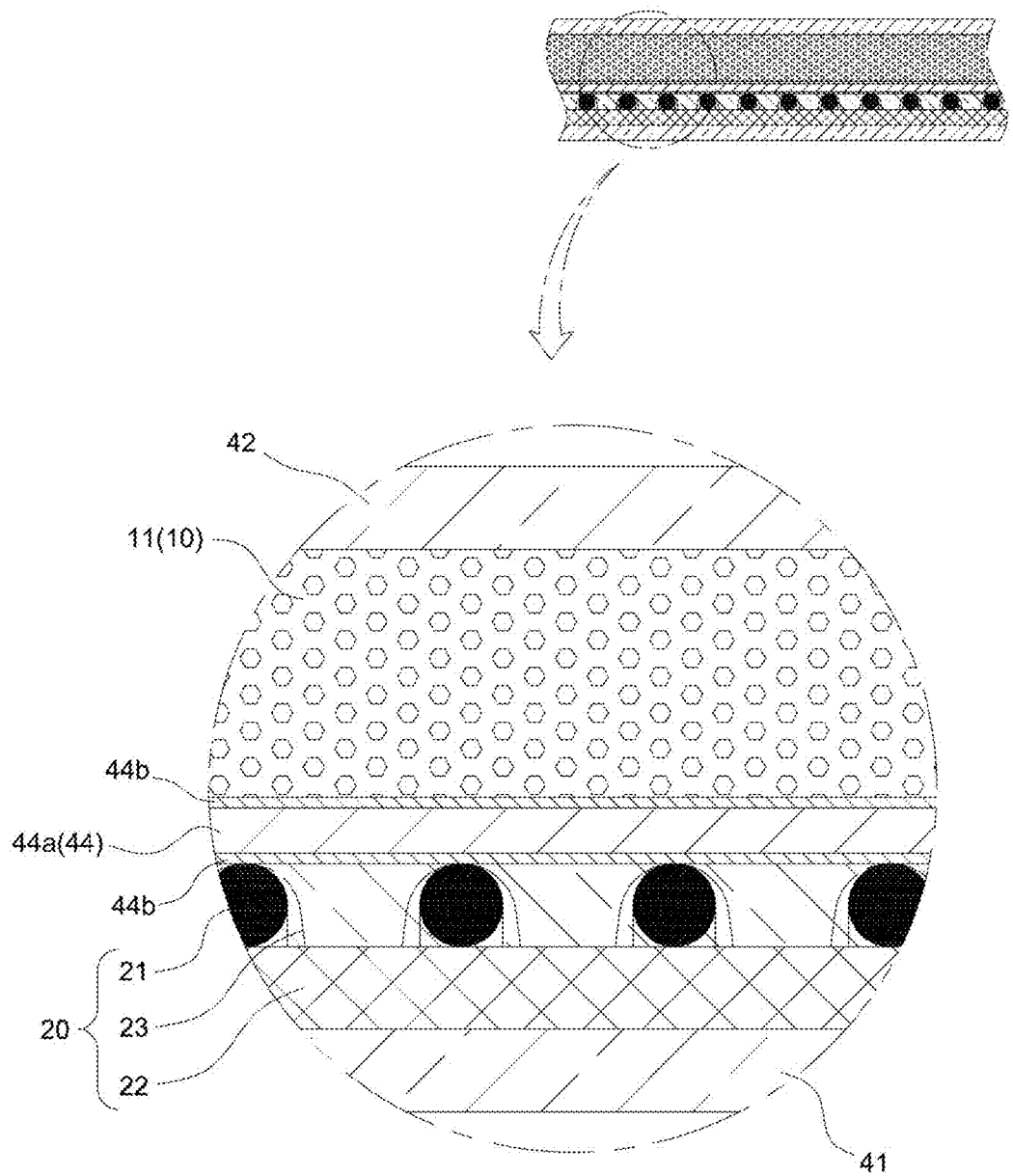
FIG. 3 is a sectional view taken along line B-B' in FIG. 2.

FIG. 1 is a perspective view of a pipe heater according to an embodiment of the present invention, FIG. 2 is a sectional view taken along line A-A' in FIG. 1, and FIG. 3 is a sectional view taken along line B-B' in FIG. 2.

As illustrated in the drawings, a pipe heater according to an embodiment of the present invention includes a tubular heat insulating layer 10 having a pair of separating surfaces 11a formed over the entire length thereof, an external cover 42 bonded to the outer surface of the heat insulating layer 10 to enclose the heat insulating layer 10, a heating layer 20 installed inside the heat insulating layer 10 and provided with a heating wire 21, a protection layer 44 interposed between the heat insulating layer 10 and the heating wire 21, an internal cover 41 installed inside the heating layer 20 to enclose the heating layer 20, a restraint part 45 bonded to the outer cover 42, lead wires 32 electrically connected to the heating wire 21, and connectors 31 electrically connected to the lead wire 32.

The heat insulating layer 10 includes a polyimide foam layer 11 formed of polyimide foam.

The external cover 42 is formed of an insulating material, such as PTFE (polytetrafluoroethylene).

In addition to the heating wire 21, the heating layer 20 includes a heating wire support cloth 22.

The heating wire 21 may be formed in a bare wire form or in an insulation-coated form.

In addition, the heating wire 21 is fixed to the heating wire support cloth 22 by a sewing thread 23 formed of a heat-resistant material, such as silica.

The heating wire support cloth 22 may be formed of a heat-resistant material, such as a glass fiber cloth.

The heating layer 20 formed as described above is installed such that the heating wire 21 is in contact with the inner surface of the protection layer 44.

The protection layer 44 includes a polyimide cloth protection layer 44a.

The polyimide cloth protection layer 44a is fabricated by coating a polyimide resin on both surfaces of a woven polyimide fiber cloth.

As a result, the polyimide cloth protection layer 44a takes a form in which resin layers 44b are formed on both sides of the woven polyimide fiber cloth.

Here, the polyimide resin may be coated through, for example, a process of immersing a polyimide cloth in liquid polyimide resin, a process of adjusting the thickness of the polyimide resin coated on the polyimide cloth, and a process of drying the polyimide resin coated on the polyimide cloth (preferably at a temperature in a range of about 200° C. to about 400° C.). Or, the polyimide resin may be coated through, for example, a process of passing a polyimide cloth through a nip between a coating roller having a plurality of resin accommodation recesses formed to be dispersed on the surface thereof (the polyimide resin may be accommodated in the resin accommodation recesses by rotating the coating roller in a state where the coating roller is partly immersed in the liquid polyimide resin stored in a tank) and a pressure roller so that the polyimide cloth is coated with the polyimide resin, and a process of drying the coated polyimide resin (preferably at a temperature in a range of about 200° C. to about 400° C.).

In addition, for example, a defoaming agent may be added to the polyimide resin at the time of coating.

The protection layer 44 formed as described above is interposed between the polyimide foam layer 11 and the heating wire 21 so as to prevent bubbles distributed in the polyimide foam layer 11 from dissipating due to the heat transferred from the heating wire 21.

The internal cover 41 is formed of an insulating material, such as PTFE (polytetrafluoroethylene).

The internal cover 41 is connected with the external cover 42 via a pair of end covers 43.

The restraint part 45 may be attached to the external cover 42 using female and male Velcro tapes.

The heating wire 21 is electrically connected to an external power source via the lead wires 32 and the connectors 31.

While the above-described embodiment forms the protection layer 44 by coating the polyimide resin on the both surfaces of a woven polyimide fiber cloth, the protection layer 44 may be formed of a polyimide film.

Figure 4:
FIG. 4 is a view for describing an effect of the present invention.
Figure 5:
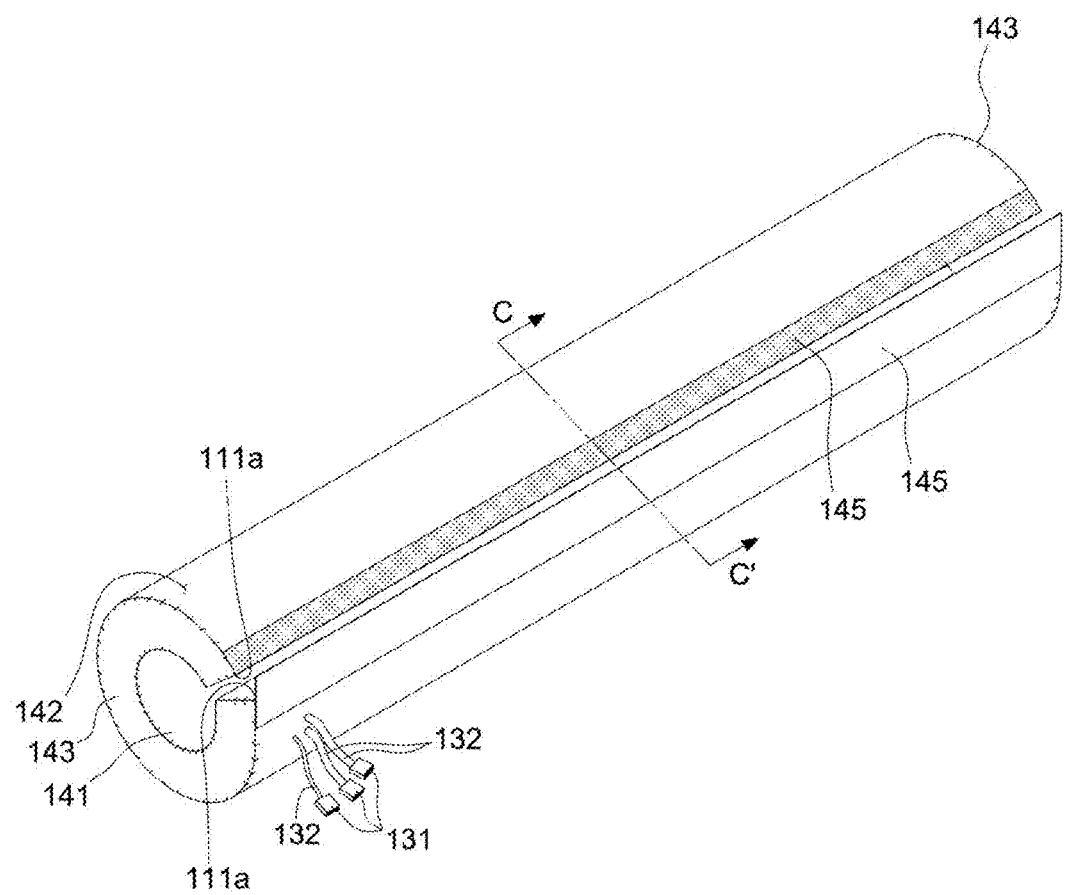
FIG. 5 is a perspective view a conventional pipe heater.
Figure 6:
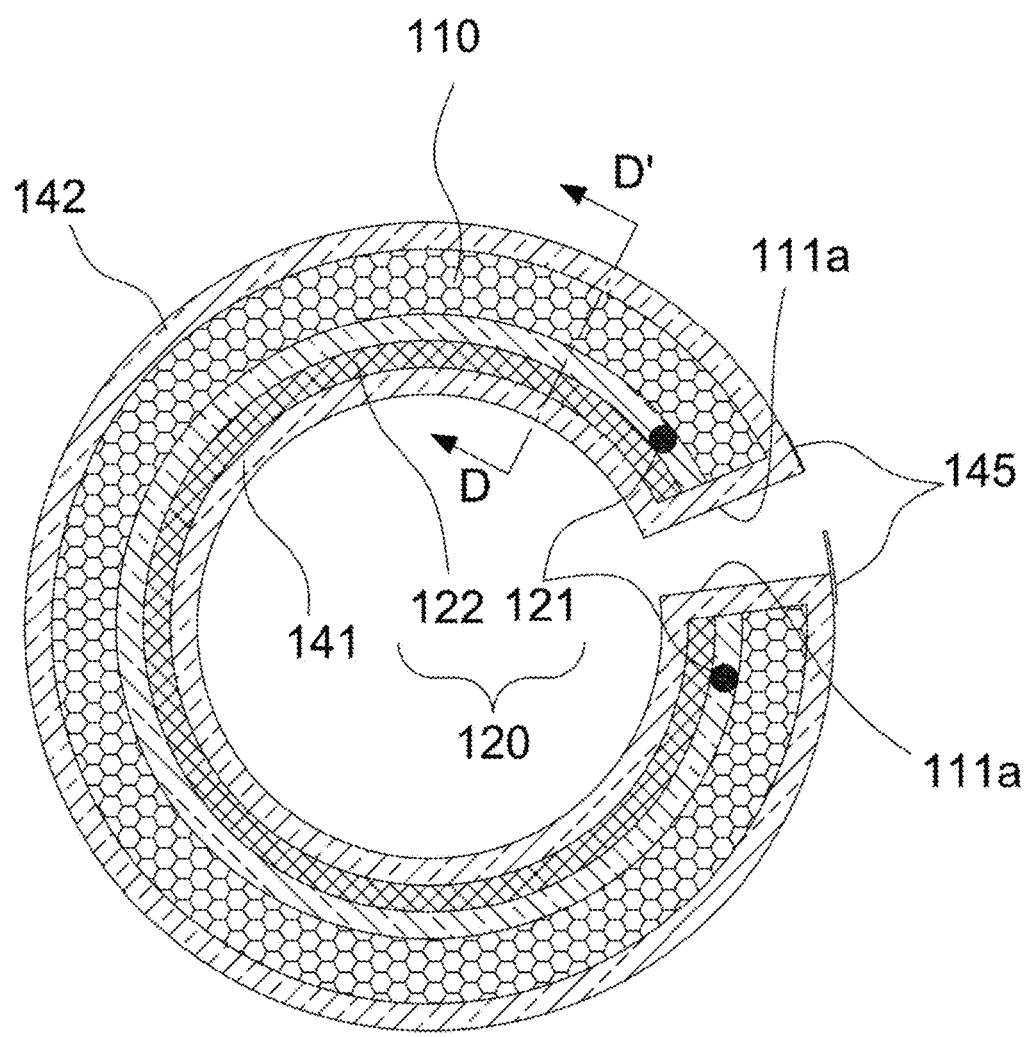
FIG. 6 is a sectional view taken along line C-C' in FIG. 5.
Figure 7:
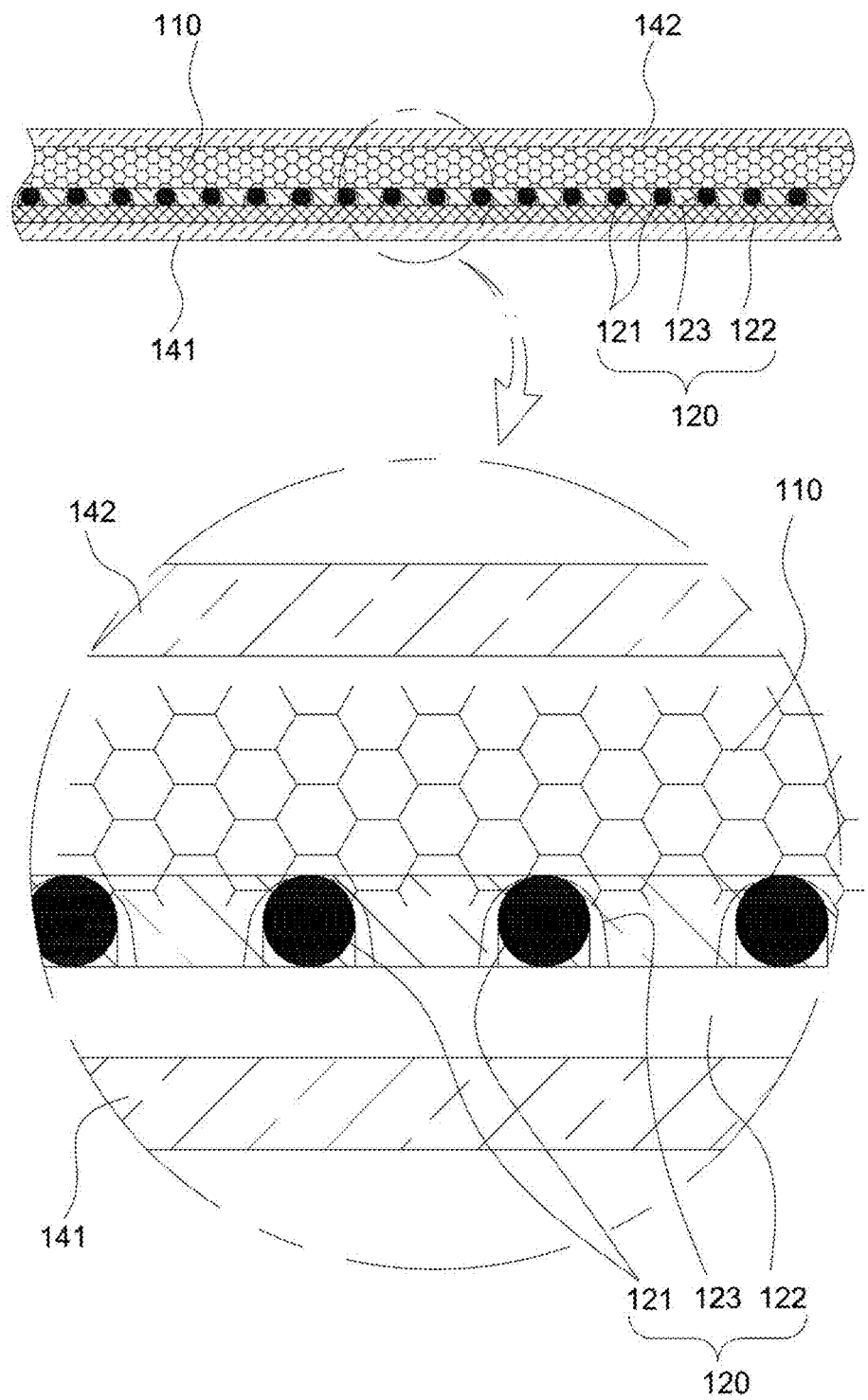
FIG. 7 is a sectional view taken along line D-D' in FIG. 6.

As described above, according to the embodiment of the present invention, since the heat insulating layer 10 is formed to include a polyimide foam layer 11 formed of polyimide foam, and the protection layer 44 interposed between the polyimide foam layer 11 and the heating wire 21 is added so as to prevent the bubbles distributed in the polyimide foam layer 11 from dissipating due to the heat transferred from the heating wire 21, the pipe heater is improved in heat insulating property as it takes a foam structure and dissipation of bubbles is prevented, and its heat insulating property may be easily improved by increasing the thickness of the protection layer. In the state where there is no protection layer 44, the bubbles distributed in the polyimide foam layer 11 dissipate due to the heat transferred from the heating wire 21, and as a result, a mark of the heating wire 21 occurs in the polyimide foam layer 11, as illustrated in FIG. 4.

In addition, when the protection layer 44 is formed of a polyimide film, the contact area between the heating wire 21 and the polyimide foam layer 11 may be reduced so that the quantity of heat transferred from the heating wire 21 to the polyimide foam layer 11 can be reduced. Since the protection layer formed of the polyimide film receives a smaller quantity of heat per unit volume than the polyimide foam due to its structure (which is not in the form of foam) polyimide foam, the protection layer is not damaged.

In addition, when the protection layer 44 is formed by coating the polyimide resin on the both surfaces of a woven polyimide fiber cloth, it is possible to form the protection layer 44 using the polyimide fiber that is characterized by a high melting point (about 400° C.) while solving a problem of degradation of a heat insulating property of the cloth. Since the protection layer formed by coating the polyimide resin on the both surfaces of the polyimide fiber receives a smaller quantity of heat per unit volume than the polyimide foam due to its structure (which is not in the form of foam), the protection layer is not damaged.

What is claimed is:

1. A pipe heater comprising:
   a tubular heat insulating layer having a pair of separating surfaces formed over the entire length thereof;
   an external cover bonded to the outer surface of the tubular heat insulating layer to enclose the tubular heat insulating layer;
   a heating layer provided inside the tubular heat insulating layer and including a heating wire therein; and
   an internal cover provided inside the heating layer to enclose the heating layer,
   wherein, the tubular heat insulating layer includes a polyimide foam layer formed of a polyimide foam, and a protection layer is interposed between the tubular heat insulating layer and the heating wire to prevent bubbles distributed in the polyimide foam layer from dissipating due to heat transferred from the heating wire, and
   wherein the protection layer is formed by coating a polyimide resin on both surfaces of a woven polyimide fiber cloth.

\* \* \* \* \*